United States Patent
Kim et al.

(10) Patent No.: US 11,206,856 B2
(45) Date of Patent: Dec. 28, 2021

(54) SWEETENER CONTAINING ENZYMATICALLY MODIFIED STEVIA COMPOSITION HAVING IMPROVED SWEETNESS QUALITY

(71) Applicant: DAEPYUNG CO., LTD., Seongnam-si (KR)

(72) Inventors: Kyung-Jae Kim, Seoul (KR); Seong-Woo Bae, Sejong (KR); Rae-Kyoung Kim, Sangju-si (KR); Dong-Hwan Kim, Gyeongsangbuk-do (KR)

(73) Assignee: DAEPYUNG CO., LTD., Seongnam-si (KR)

( * ) Notice: Subject to any disclaimer, the term of this patent is extended or adjusted under 35 U.S.C. 154(b) by 641 days.

(21) Appl. No.: 15/767,304

(22) PCT Filed: Sep. 7, 2017

(86) PCT No.: PCT/KR2017/009788
§ 371 (c)(1),
(2) Date: Apr. 10, 2018

(87) PCT Pub. No.: WO2019/050062
PCT Pub. Date: Mar. 14, 2019

(65) Prior Publication Data
US 2019/0281873 A1    Sep. 19, 2019

(30) Foreign Application Priority Data
Sep. 5, 2017 (KR) .................. 10-2017-0113392

(51) Int. Cl.
*A23L 27/30* (2016.01)
*A23L 3/005* (2006.01)
*A23L 29/00* (2016.01)

(52) U.S. Cl.
CPC .............. *A23L 27/33* (2016.08); *A23L 3/005* (2013.01); *A23L 27/30* (2016.08); *A23L 29/00* (2016.08); *A23V 2002/00* (2013.01); *A23V 2250/258* (2013.01)

(58) Field of Classification Search
CPC .......... A23L 29/00; A23L 27/30; A23L 27/33; A23L 3/005; A23V 2250/258

USPC ........................................................... 426/48
See application file for complete search history.

(56) References Cited

U.S. PATENT DOCUMENTS

| | | | |
|---|---|---|---|
| 2007/0082102 A1 | 4/2007 | Magomet et al. | |
| 2010/0099857 A1 | 4/2010 | Evans et al. | |
| 2011/0256588 A1 | 10/2011 | Lee et al. | |
| 2014/0030381 A1 | 1/2014 | Jin et al. | |
| 2014/0227421 A1* | 8/2014 | Markosyan | C12P 19/18 426/551 |
| 2015/0218533 A1* | 8/2015 | Ono | C12Y 204/01 800/298 |
| 2017/0022240 A1 | 1/2017 | Markosyan | |

FOREIGN PATENT DOCUMENTS

| | | |
|---|---|---|
| KR | 10-2003-0025822 A | 3/2003 |
| KR | 10-0851610 B1 | 8/2008 |
| KR | 10-0888694 B1 | 3/2009 |
| KR | 10-2011-0115699 A | 10/2011 |
| KR | 10-1531202 B1 | 6/2015 |
| KR | 10-1535427 B1 | 7/2015 |

OTHER PUBLICATIONS

NPL Wang et al. (in Bioscience, Biotechnology and Biochemistry vol. 80, (1), 67-73, 2016). (Year: 2016).*
Annexure A search report of NPL Reference (See last Ref of p. 1 is NPL Wang et al. 2016). (Year: 2016).*
Prior art web search printable history using google scholar was performed on Apr. 19, 2021 and attached. (Year: 2021).*

* cited by examiner

*Primary Examiner* — Bhaskar Mukhopadhyay
(74) *Attorney, Agent, or Firm* — Novick, Kim & Lee, PLLC; Jae Youn Kim

(57) ABSTRACT

This invention relates to a sweetener containing an enzymatically modified stevia composition having improved sweetness quality, including 90 wt % or more of steviol glycoside, wherein only glycosylation is carried out using cyclodextrin as a glycosylation material of a stevia extract (steviol glycoside), without a purification process using an existing porous adsorbent resin (aromatic, styrene type), to thus produce enzymatically modified stevia, which can be utilized as an ingredient and a reagent for sweeteners, flavor enhancers and flavor modifiers for a variety of confections, drinks (including alcoholic beverages), foods and food products, thereby providing an enzymatically modified stevia sweetener and products thereof.

5 Claims, 2 Drawing Sheets

SWEETENER CONTAINING ENZYMATICALLY MODIFIED STEVIA COMPOSITION HAVING IMPROVED SWEETNESS QUALITY

TECHNICAL FIELD

The present invention relates to a sweetener containing an enzymatically modified stevia composition having improved sweetness quality, and more particularly to a sweetener containing an enzymatically modified stevia composition having improved sweetness quality, which includes 90 wt % or more of steviol glycoside.

BACKGROUND ART

Sugar has traditionally been widely used as a sweetener for food. In particular, a large amount of sugar is used for coffee drinks, including canned coffee, or soft drinks, such as carbonated drinks, and the like. However, there is a recent tendency to reduce the amount of sugar, which causes obesity, diabetes, and tooth decay, or to use a sweetener having high sweetness instead of sugar, due to the trends towards improved health and low calorie consumption. Such sweeteners having high sweetness are representatively exemplified by a stevia sweetener extracted from stevia, a perennial plant of Asteraceae, originating in Paraguay, South American. Worldwide consumption of stevia sweetener is 30% in North America, 20% in Korea, 15% in Japan, 20% in China, and 15% in other countries. The stevia sweetener may be largely classified into two types, namely a stevia extract (steviol glycoside), which is prepared through extraction and purification from plants, and enzymatically modified stevia, which is prepared by adding the stevia extract with glucose using an enzyme and dextrin prepared from starch.

In the stevia sweetener consumed in Korea, enzymatically modified stevia (named under Food Additive Code) accounts for about 95% or more based on the total amount thereof. Among stevia sweeteners, enzymatically modified stevia is advantageous in that ① it has sweetness quality close to sugar and no bitter taste, and has substantially zero calories because of sweetness as high as 100 to 250 times that of sugar; ② it is resistant to heat and acids, and thus changes less in sweetness during processing and preservation; ③ it is difficult for microorganisms to use as a nutrient source, and is substantially non-carious in the oral cavity; ④ it does not cause a Maillard reaction, and is not readily browned in food processing; ⑤ it reduces a pickled taste; ⑥ it reduces acidity; ⑦ the resultant decrease in freezing point is low; ⑧ it does not increase permeation pressure; ⑨ it has a synergistic effect with other sweeteners, which is effective at reducing sweetener costs; and ⑩ it has a refreshing sweetness quality and alleviates the thick taste of a saccharide sweetener.

However, despite the above advantages and the improvement of sweetness quality by an enzyme reaction and a purification process in a stevia leaf extract, enzymatically modified stevia is disadvantageous in that the increase in sweetness is slow compared to other saccharide sweeteners (sugar, fructose, etc.), and a sweet aftertaste remains relatively long, and thus the resulting sweetness becomes poor. Furthermore, apart from sweetness, stevioside, which is abundant in the stevia sweetener, has drawbacks in which the aftertaste includes a distinctive astringent taste or bitter taste, and is thus often unsuitable for use in coffee drinks, soft drinks, and alcoholic beverages.

Hence, methods of subjecting steviol glycoside composed mainly of rebaudioside A to α-addition with glucose are proposed, in which, during the enzyme reaction, long-chain glucose is formed from glucose added to rebaudioside A, and sweetness of the sweetener containing α-glucosyl rebaudioside A thus obtained is decreased somewhat compared to rebaudioside A. In particular, there is a problem in that the sweet aftertaste remains, thus resulting in unpleasant or harsh sweetness.

Accordingly, with the goal of solving such problems, thorough research into improvements in the sweetness quality of enzymatically modified stevia has been carried out, and the present inventors have thus ascertained a method of easily preparing an enzymatically modified stevia composition, which is superior in sweetness quality compared to existing methods, thus culminating in the present invention.

CITATION LIST

Patent Literature (Patent Document 1) Korean Patent No. 10-1535427 (Title: Method of preparing enzymatically modified stevia sweetener having superior sweetness quality, Applicant: Daepyung Co. Ltd., Registration Date: Jul. 3, 2015)

(Patent Document 2) Korean Patent No. 10-1531202 (Title: Improvement in sweetness quality of stevia extract, Applicant: San-Ei Gen F.F.I. Inc., Registration Date: Jun. 18, 2015)

(Patent Document 3) Korean Patent No. 10-0888694 (Title: Method of preparing enzymatically modified stevia having superior sweetness quality, Applicant: Daepyung Co. Ltd., Registration Date: Mar. 6, 2009)

(Patent Document 4) Korean Patent No. 10-0851610 (Title: Sweetener and Method of preparing the same, Applicant: DIC Corporation, Registration Date: Aug. 5, 2008)

DISCLOSURE

Technical Problem

Accordingly, the present invention is intended to provide a sweetener containing an enzymatically modified stevia composition having improved sweetness quality. Specifically, the present invention is intended to provide a sweetener containing an enzymatically modified stevia composition having improved sweetness quality, comprising 90 wt % or more of steviol glycoside. A conventional enzymatically modified stevia composition prepared by subjecting a stevia extract or steviol glycoside to glycosylation through enzymatic modification is reduced in bitter taste compared to before enzymatic modification, but is disadvantageous because the remaining sweet aftertaste becomes intense with an increase in the number of glycosyl groups that are attached to steviol glycoside including rebaudioside A. However, in the present invention, a method of maximally increasing the amount of rebaudioside A having one glycosyl group attached thereto by recrystallizing the enzymatically modified stevia composition in the presence of an alcohol after enzymatic modification is devised, thereby enabling the production of an enzymatically modified stevia composition having remarkably improved sweetness quality.

Technical Solution

The present invention provides a sweetener, satisfying the following Relation (1).

$$15 \geq (RAG1+RAG2)/RA \geq 3.87 \quad (1)$$

Here, RA represents the proportion (%) of non-glycosylated rebaudioside A in total rebaudioside A, RAG1 represents the proportion (%) of rebaudioside A having one glycosyl group attached thereto, and RAG2 represents the proportion (%) of rebaudioside A having two glycosyl groups attached thereto.

The sweetener preferably satisfies the following Relation (2).

$$1.17 \geq (RA+RAG1+RAG2)/TRA \geq 0.8 \quad (2)$$

Here, TRA represents the proportion (%) of total rebaudioside A in total steviol glycoside.

Also, the sweetener satisfies the following Relation (3).

$$32.8 \geq RAG1/RAG2 \geq 7.2 \quad (3)$$

More preferably, the sweetener satisfies all of Relations (1), (2) and (3).

The sweetener contains 90 wt % or more of steviol glycoside.

In addition, the present invention provides a method of preparing a sweetener containing an enzymatically modified stevia composition. The method of the present invention includes a crystallization process using an alcohol, which is not applied in a conventional method of preparing an enzymatically modified stevia composition, thereby producing a sweetener satisfying Relation (1), (2) or (3). In particular, compared to an enzymatically modified stevia composition prepared by the conventional method, an enzymatically modified stevia composition, in which the amount of rebaudioside A having one glycosyl group attached thereto is maximized, may be prepared. The enzymatically modified stevia composition thus prepared is remarkably decreased in the remaining sweet aftertaste, and may thus function as a sweetener having improved sweetness quality.

The preparation method of the invention preferably includes a first step of mixing steviol glycoside containing 80 wt % or more of non-glycosylated rebaudioside A with beta-cyclodextrin at a weight ratio of 1:1~3 to give a mixture which is then dissolved in water in an amount two to four times the total raw material weight and is adjusted to a pH of 5.0~6.0, 60~80° C. and 20~50 Brix; a second step of adding 0.1~3 parts by weight of cyclodextrin glucanotransferase, based on 100 parts by weight of the steviol glycoside used as the raw material in the first step, and carrying out a primary enzyme reaction for 24~50 hr; a third step of adding 0.5~2 parts by weight of glucoamylase, based on 100 parts by weight of the steviol glycoside used as the raw material in the first step, to the reaction product obtained through the primary enzyme reaction, under conditions of a pH of 4.0~5.0 and a temperature of 55~65° C., and carrying out a secondary enzyme reaction for 1~3 hr; a fourth step of warming the reaction product obtained through the secondary enzyme reaction to 85~95° C. for 1~3 hr to thus deactivate the enzyme, and performing filtration, separation, concentration and drying, followed by crystallization with stirring for 2~3 hr in the presence of an alcohol; and a fifth step of subjecting the crystallized product obtained in the fourth step to filtration, washing, concentration, sterilization and drying.

The enzymatically modified stevia composition thus obtained contains a total steviol glycoside content of 90~99 wt %, and the proportion of total rebaudioside A (including both unreacted rebaudioside A having no glycosyl group+ glycosylated rebaudioside A) in the total steviol glycoside is 80 wt % or more, and preferably 80~99 wt %.

The total raw material weight in the first step designates the total weight of steviol glycoside and beta-cyclodextrin.

The total rebaudioside A of the composition comprises 10~25% of unreacted rebaudioside A having no glycosyl group, 60~85% of rebaudioside A having one glycosyl group, 2~10% of rebaudioside A having two glycosyl groups, and 0~10% of the remainder. The remainder may include rebaudioside A having three or more glycosyl groups. In the method of preparing the composition according to the present invention, the yield may amount to 60% or more based on the steviol glycoside used as the raw material.

Here, steviol glycoside used as the raw material is prepared in a manner in which a stevia extract containing 40~60 wt % of rebaudioside A is recrystallized with methanol or ethanol and filtered to give steviol glycoside containing 80 wt % or more, and preferably 90 wt % or more of non-glycosylated rebaudioside A.

When steviol glycoside and beta-cyclodextrin are mixed in the first step, beta-cyclodextrin in crystal form may be used.

In the method of preparing the sweetener of the present invention, the filtration and separation in the fourth step may be performed through diatomite filtration and then ultrafiltration. The fourth step may further include purifying impurities using an adsorbent resin after the filtration.

The alcohol used in the fourth step during the preparation method may be ethanol or methanol, or alternatively may be an 85~95% (v/v) alcohol aqueous solution.

The concentration in the fourth step or fifth step during the preparation method may be performed through concentration under reduced pressure or reverse osmosis concentration.

The filtration and washing in the fifth step during the preparation method may be performed through centrifugal filtration and then alcohol washing, and the sterilization thereof may be conducted through UHT sterilization (ultra-high-temperature sterilization). Here, the drying in the fourth step or fifth step may be performed through a process selected from among spray drying, hot air drying and freeze-drying. The alcohol used for the washing in the fifth step is preferably the same as the alcohol used in the crystallization process.

In the present invention, steviol glycoside used as the raw material for the enzymatically modified stevia composition contains a steviol glycoside ingredient represented by Chemical Formula 1 below and shown in Table 1 below.

[Chemical Formula 1]

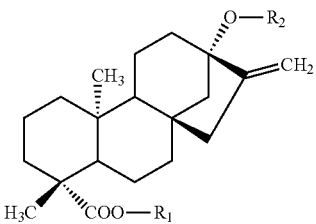

TABLE 1

| Compound | $R_1$ | $R_2$ | MW |
|---|---|---|---|
| Stevioside | Glc(β)- | Glc(β1-2)-Glc(β)- | 804.9 |
| Rebaudioside A | Glc(β)- | Glc(β1-2)-Glc(β)-Glc(β1-3)⌐ | 967.0 |
| Rebaudioside B | H- | Glc(β1-2)-Glc(β)-Glc(β1-3)⌐ | 804.9 |
| Rebaudioside C | Glc(β)- | Rha(α1-2)-Glc(β)-Glc(β1-3)⌐ | 951.0 |
| Rebaudioside D | Glc(β1-2)-Glc(β)- | Glc(β1-2)-Glc(β)-Glc(β1-3)⌐ | 1129.2 |
| Rebaudioside F | Glc(β)- | Xyl(β1-2)-Glc(β)-Glc(β1-3)⌐ | 937.0 |
| Steviolbioside | H- | Glc(β1-2)-Glc(β)- | 642.7 |
| Dulcoside A | Glc(β)- | Rha(α1-2)-Glc(β)- | 788.9 |
| Rubusoside | Glc(β)- | Glc(β)- | 642.7 |

Glc: D-glucose, Rha: L-rhamnose, Xyl: D-xylose

The above steviol glycoside may be steviol glycoside containing, among steviol glycoside ingredients, non-glycosylated rebaudioside A in an amount of 80 wt % or more, and preferably 90 wt % or more. The non-glycosylated rebaudioside A may be contained in an amount up to 99 wt % in the steviol glycoside.

According to the present invention, the rebaudioside A may be enzymatically modified, thereby obtaining an enzymatically modified stevia composition in which the amount of glycosyl-group-attached rebaudioside A, especially rebaudioside A having one glycosyl group attached thereto, is maximized.

In the present invention, the sweetener containing the enzymatically modified stevia composition thus prepared may be used as a food and a food additive, and thus it is possible to provide a food composition including the above sweetener.

In addition, the food and food additive may include drinks including coffee drinks, soft drinks, juice drinks, powder drinks, dairy products and alcoholic beverages, candy or confectionery.

As described above, the sweetener having an improved sweetness quality obtained by the preparation method of the present invention may be used alone or in combination with a low-calorie sweetener, the sweetness of which is lower than that of sugar, such as sorbitol, maltitol, reduced starch syrup, xylitol, trehalose, erythritol, and the like, and particularly may impart more intense sweetness without harming the characteristics of the sweetener used therewith, and may thus be made into a high-quality low-calorie sweetener formulation.

Also, the dry product of the sweetener obtained by the preparation method of the present invention is a powder that shows a color ranging from white to light yellow and has no odor or a slight characteristic odor. Thus, the dry product of the sweetener may be used alone or in combination with, as a diluent, a saccharide sweetener, such as sugar, fructose, glucose, lactose, isomerized sugar, starch syrup, and the like. Furthermore, it may be appropriately used in combination with a non-saccharide sweetener having high sweetness, such as a licorice extract, saccharin, aspartame, acesulfame potassium, sucralose, and the like.

For example, a sweetener, comprising the sweetener of the present invention, starch, dextrin and additional sugar, which are mixed together, may be provided, and the additional sugar may be selected from the group consisting of sorbitol, maltitol, xylitol, trehalose, erythritol, sugar, fructose, glucose, lactose, isomerized sugar, starch syrup, licorice extract, saccharin, aspartame, acesulfame potassium and sucralose.

Advantageous Effects

The present invention pertains to a sweetener containing an enzymatically modified stevia composition having improved sweetness quality, comprising 90 wt % or more of steviol glycoside, wherein only glycosylation is carried out using cyclodextrin as a glycosylation material of a stevia extract (steviol glycoside), without a purification process using an existing porous adsorbent resin (aromatic, styrene type), thus producing enzymatically modified stevia, which can be utilized as an ingredient and a reagent for sweeteners, flavor enhancers and flavor modifiers for a variety of confections, drinks (including alcoholic beverages), foods and food products, thereby providing an enzymatically modified stevia sweetener and products thereof. Meanwhile, the present inventors have continued to develop techniques for preparing an enzymatically modified stevia sweetener as disclosed in Korean Patent Nos. 10-1535427 and 10-0888694, making it possible to prepare a stevia composition having remarkably improved sweetness quality with high total steviol glycoside content by further subdividing the enzymatic modification process compared to existing preparation methods.

BEST MODE

Figure 1:
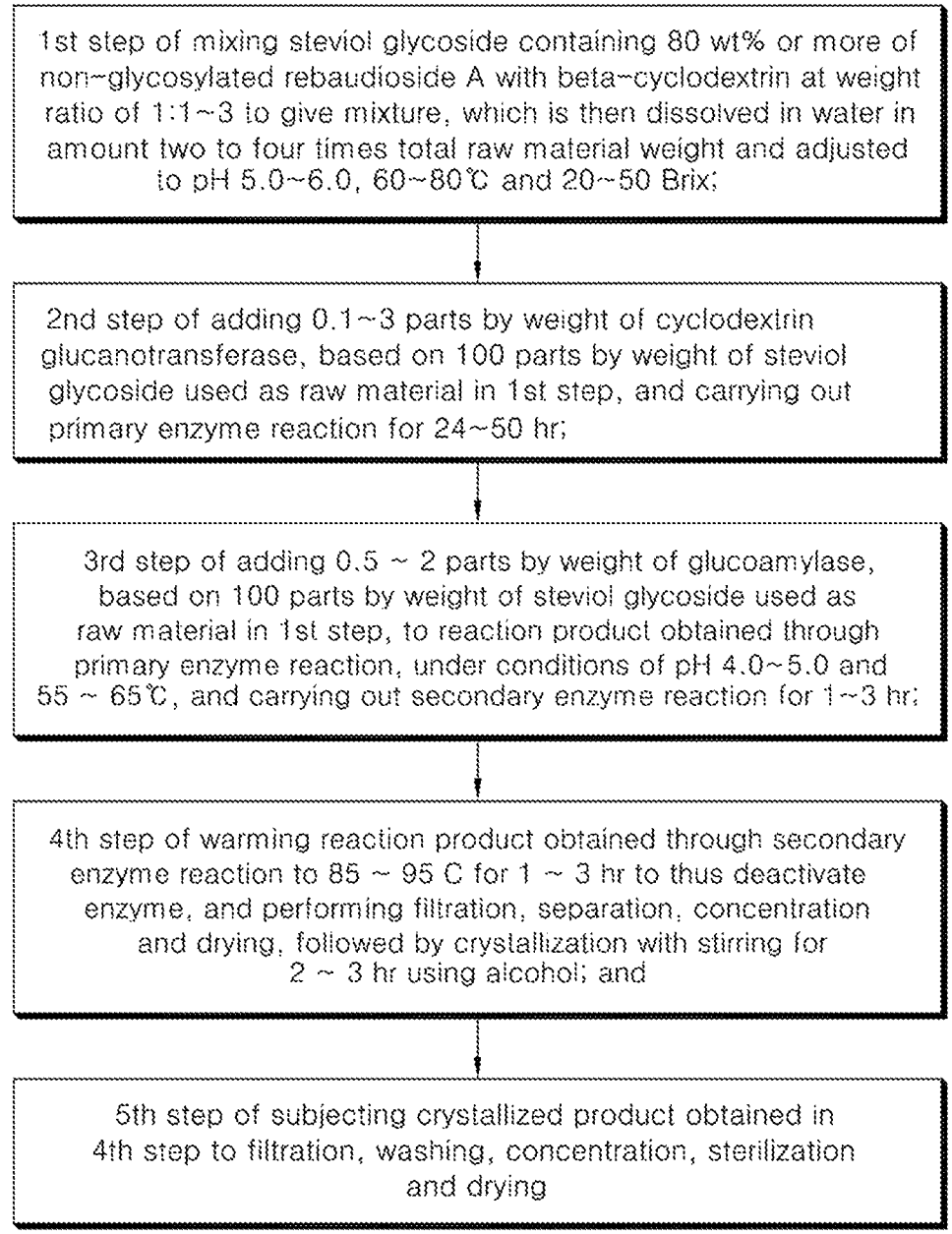
FIG. 1 is a flowchart showing the process of preparing a sweetener containing an enzymatically modified stevia composition according to the present invention.
Figure 2:
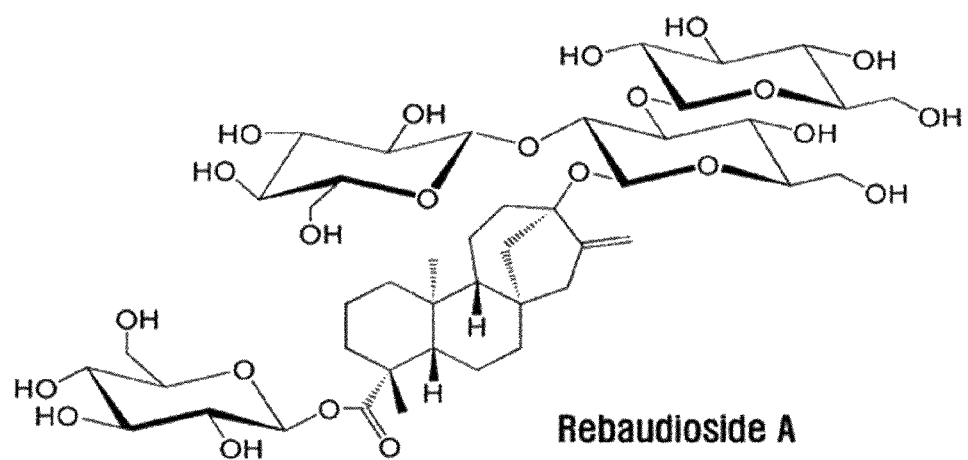
FIG. 2 shows the chemical formula of rebaudioside A, in which a glycosyl group may be attached to the hydroxyl group thereof.

A better understanding of the present invention will be given through the following examples. However, the present invention is not limited to the examples, and may be embodied in other forms, and is provided in order to sufficiently transfer the spirit of the present invention to those skilled in the art such that the contents presented therein will be thorough and complete.

EXAMPLE 1

Preparation of Enzymatically Modified Stevia Composition i

An enzymatically modified stevia composition was prepared as follows. Here, intermediate products (numerical indication) and a final product were measured for glycosylation rate.

Specifically, a stevia extract containing 90 wt % of RA (non-glycosylated rebaudioside A) and beta-cyclodextrin were mixed at a weight ratio of 1:2, dissolved in water in an amount three times the total raw material weight thereof, and adjusted to pH 5.5, 70° C., and 30 Brix. For primary enzyme reaction, CGTase (cyclodextrin glucanotransferase) was added such that the amount thereof was 1.6 g based on 100 g of the stevia extract, and was allowed to react[1] for 40 hr.

Next, for secondary enzyme reaction, glucoamylase was added such that the amount thereof was 0.8 g based on 100 g of the stevia extract under conditions of pH 4.5 and 58° C. and was allowed to react[2] for 1 hr 40 min, followed by enzyme deactivation at 90° C. The reaction product, in which the enzyme was deactivated, was filtered with diatomite, subjected to membrane separation[3] through ultrafiltration, followed by concentration under reduced pressure and then spray drying[4], after which the resulting dry product was dissolved at a maximum of 60° C. in a 92% (v/v) ethanol aqueous solution in a volume three times the weight thereof, cooled to 45° C., and crystallized with stirring for 2~3 hr. Thereafter, centrifugal filtration, washing[5] with a 92% (v/v) ethanol aqueous solution, concentration under reduced pressure, UHT sterilization (ultrahigh-temperature sterilization) and then spray drying[6] were performed. In these processes, the compositions obtained in respective steps[superscript indication] were measured for RA glycosylation rate, total rebaudioside A proportion in total steviol glycoside, and the proportion of each RA ingredient in the total rebaudioside A. The results are shown in Table 2 below.

In Table 2 below, RAG1 to RAG5 represent glycosylated rebaudioside A, individual numerals showing the number of attached glycosyl groups. Specifically, RAG1 means that one glycosyl group is attached to rebaudioside A, and RAG5 means that five glycosyl groups are attached to rebaudioside A.

Here, rebaudioside A content analysis (RA and RAG1~G6 proportion analysis) was performed through HPLC (high performance liquid chromatography) under the following conditions.

TABLE 3

| Instrument | WATERS 2695 Separations Module |
|---|---|
| Detection | WATERS Detector (210 nm), Waters 2487 Dual λ Absorbance Detector Lamp |
| Mobile Phase | Acetonitrile:Water = 70:30 |
| Column | Amino group-bonded silica gel - TOSOH TSKgel Amide-80 or equivalents thereto (5 μm, 4.6 mm × 25 cm) |
| Flow rate | 0.8 ml/min |
| Temperature | 30° C. |
| Injection Volume | 20 μL |

$$\text{Total } RA \text{ Proportion} = RA + RA \ G1 \sim G6 \ \% \text{ Area Sum}$$

$$RA \text{ Glycosylation Rate (\%)} = \frac{\text{Total } RA \text{ Proportion} - \text{Unreacted } RA \text{ Proportion (Area\%)}}{\text{Total } RA \text{ Proportion}} \times 100$$

$$\text{Each Ingredient Proportion (\%)} = \frac{\text{Proportion of Each Ingredient (Area\%)}}{\text{Total } RA \text{ Proportion}} \times 100$$

In the above equations, Area % is determined by measuring the area of an HPLC peak of each of the RA ingredients.

The total steviol glycoside content was determined by combining steviol glycoside content (%) after glucoamylase treatment of the adsorbed enzymatically modified stevia in accordance with [steviol glycoside] assay of enzymatically modified stevia assay with the amount (%) of α-glucosyl residue isolated after glucoamylase treatment. The operating conditions of an analyzer for confirming the amount of steviol glycoside are as follows.

TABLE 2

| Process | RA Glycosylation rate (%) | Total RA proportion in reaction product (%) | RA (%) | RAG1 (%) | RAG2 (%) | RAG3 (%) | RAG4 (%) | RAG5 (%) | RAG6 (%) | Yield (%) | Total steviol glycoside content (%) in reaction product |
|---|---|---|---|---|---|---|---|---|---|---|---|
| 1) | 88.6 | 94.23 | 11.4 | 15.6 | 16.2 | 16.3 | 15.9 | 13.8 | 10.8 | — | — |
| 2) | 73.2 | 87.86 | 26.8 | 65.7 | 7.5 | — | — | — | — | — | — |
| 3) | 73.7 | 87.8 | 26.3 | 65.6 | 8.1 | — | — | — | — | — | — |
| 4) | 73.9 | 86.9 | 26.1 | 65.8 | 8.1 | — | — | — | — | 135.1 | — |
| 5) | 82.2 | 92.0 | 17.8 | 75.1 | 7.1 | — | — | — | — | 74.7 | — |
| 6) | 81.8 | 92.0 | 18.5 | 73.7 | 7.8 | — | — | — | — | 66.0 | 95.7 |

TABLE 4

| Detector | UV absorption spectrometer (measurement wavelength 210 nm) |
|---|---|
| Column | For liquid chromatography, octadecylsilylated silica gel filler 5 μm, inner diameter 4.6 mm, length 250 mm, stainless steel column |
| Column Temperature | 40° C. |
| Mobile phase | Phosphate buffer (0.01 mol/L, pH 2.6)/acetonitrile mixed solution (17:8) |
| Flow rate | 1.0 ml/min |

EXAMPLE 2

Preparation of Enzymatically Modified Stevia Composition ii

An enzymatically modified stevia composition was prepared in the same manner as in Example 1, with the exception that ethanol crystallization was performed (at 25° C., without warming) using a 90% (v/v) methanol aqueous solution at room temperature, and washing with a 90% (v/v) methanol aqueous solution was performed after centrifugal filtration. Here, in the same steps as in Example 1, RA glycosylation rate, total rebaudioside A proportion in total steviol glycoside, and the proportion of each RA ingredient in the total rebaudioside A were measured. The results are shown in Table 5 below.

TABLE 5

| Process | RA Glycosylation rate (%) | Total RA proportion in reaction product (%) | RA (%) | RAG1 (%) | RAG2 (%) | RAG3 (%) | RAG4 (%) | RAG5 (%) | RAG6 (%) | Yield (%) | Total steviol glycoside content (%) in reaction product |
|---|---|---|---|---|---|---|---|---|---|---|---|
| 1) | 90.4 | 79.97 | 9.6 | 15.5 | 16.6 | 16.1 | 15.9 | 14.4 | 11.9 | — | — |
| 2) | 73.7 | 79.18 | 26.3 | 66.9 | 6.8 | — | — | — | — | — | — |
| 3) | 73.9 | 80.14 | 26.1 | 64.6 | 8.8 | 0.5 | — | — | — | 117.5 | — |
| 4) | 74.2 | 79.79 | 25.8 | 60.8 | 11.9 | 1.5 | — | — | — | — | — |
| 5) | 82.1 | 87.9 | 17.9 | 73.4 | 7.9 | 0.8 | — | — | — | 65.2 | — |
| 6) | 82.0 | 87.8 | 18.0 | 73.6 | 7.7 | 0.7 | — | — | — | 62.0 | 95.5 |

EXAMPLE 3

Preparation of Enzymatically Modified Stevia Composition iii

The primary enzyme reaction[1], secondary enzyme reaction[2], diatomite filtration, membrane separation, concentration and spray drying[3] of the stevia extract were performed in the same manner as in Example 1, after which the powder obtained through spray drying was treated with a 85% (v/v) methanol aqueous solution, a 90% (v/v) methanol aqueous solution or a 95% (v/v) methanol aqueous solution in a volume three times the weight thereof, and crystallized with stirring for 2~3 hr. Thereafter, centrifugal filtration, washing[5] with the same alcohol as in the crystallization, concentration, UHT sterilization (ultrahigh-temperature sterilization) and then spray drying[6] were performed. In such processes, RA glycosylation rate, total rebaudioside A proportion in total steviol glycoside, and the proportion of each RA ingredient in the total rebaudioside A were measured. The results are shown in Table 6 below.

TABLE 6

| Process | RA Glycosylation rate (%) | Total RA proportion in reaction product (%) | RA % | RAG1 % | RAG2 % | RAG3 % | RAG4 % | RAG5 % | RAG6 % | Yield (%) | Total steviol glycoside content (%) in reaction product |
|---|---|---|---|---|---|---|---|---|---|---|---|
| 1) | 86.1 | 67.78 | 13.9 | 18.6 | 19.9 | 14.2 | 13.2 | 10.9 | 9.3 | — | — |
| 2) | 70.3 | 66.31 | 29.7 | 64.6 | 5.7 | — | — | — | — | — | — |
| 3) | 72.2 | 70.64 | 27.8 | 65.2 | 7.0 | — | — | — | — | — | — |

TABLE 6-continued

| Process | | RA Glycosylation rate (%) | Total RA proportion in reaction product (%) | Each RA proportion in reaction product | | | | | | | Yield (%) | Total steviol glycoside content (%) in reaction product |
|---|---|---|---|---|---|---|---|---|---|---|---|---|
| | | | | RA % | RAG1 % | RAG2 % | RAG3 % | RAG4 % | RAG5 % | RAG6 % | | |
| 6) | 85% (v/v) methanol crystallization | 84.5 | 92.8 | 15.5 | 80.7 | 3.8 | — | — | — | — | 27.3 | 96.2 |
| | 90% (v/v) methanol crystallization | 82.1 | 87.9 | 17.9 | 73.4 | 7.9 | — | — | — | — | 60.0 | 95.9 |
| | 95% (v/v) methanol crystallization | 80.4 | 87.46 | 19.6 | 76.0 | 4.4 | — | — | — | — | 51.2 | 95.3 |

EXAMPLE 4

Preparation of Enzymatically Modified Stevia Composition iv

An enzymatically modified stevia composition was prepared in the same manner as in Example 1, with the exception that ethanol crystallization was performed using a 90% (v/v) ethanol aqueous solution or a 95% (v/v) ethanol aqueous solution, and washing after centrifugal filtration was performed using the same ethanol aqueous solution as in the crystallization. In such processes, RA glycosylation rate, total rebaudioside A proportion in total steviol glycoside, and the proportion of each RA ingredient in the total rebaudioside A were measured. The results are shown in Table 7 below.

COMPARATIVE EXAMPLE 1

Preparation of Column-Purified Enzymatically Modified Stevia Composition

The primary enzyme reaction[1], secondary enzyme reaction[2], and diatomite filtration of the stevia extract were performed in the same manner as in Example 1, after which an adsorption reaction was carried out using two columns. Specifically, the filtrate obtained through diatomite filtration was passed through a first column packed with an adsorbent resin, and the passed liquid was adsorbed through a second column packed with the same adsorbent resin. After the adsorption procedure, the two columns were eluted[3] with a 50% (v/v) ethanol aqueous solution, and the elution solution thus obtained was subjected to concentration, UHT sterilization (ultrahigh-temperature sterilization) and then spray drying[4]. In such processes, RA glycosylation rate, total rebaudioside A proportion in total steviol glycoside, and the proportion of each RA ingredient in the total rebaudioside A were measured. The results are shown in Table 8 below.

TABLE 7

| Process | | RA Glycosylation rate (%) | Total RA proportion in reaction product (%) | Each RA proportion in reaction product | | | | | | | Yield (%) | Total steviol glycoside content (%) in reaction product |
|---|---|---|---|---|---|---|---|---|---|---|---|---|
| | | | | RA (%) | RAG1 (%) | RAG2 (%) | RAG3 (%) | RAG4 (%) | RAG5 (%) | RAG6 (%) | | |
| 1) | | 90.5 | 89.22 | 9.5 | 14.9 | 17.1 | 16.6 | 16.0 | 14.2 | 11.7 | — | — |
| 2) | | 73.7 | 86.86 | 26.3 | 65.8 | 7.9 | — | — | — | — | — | — |
| 3) | | 70.7 | 89.56 | 29.3 | 65.2 | 5.5 | — | — | — | — | — | — |
| 6) | 90% (v/v) ethanol crystallization | 79.5 | 86.24 | 20.5 | 76.2 | 3.3 | — | — | — | — | 53.0 | 95.1 |
| | 95% (v/v) ethanol crystallization | 80.1 | 86.09 | 19.7 | 75.1 | 2.5 | — | — | — | — | 48.7 | 95.5 |

TABLE 8

| Process | RA Glycosylation rate (%) | Total RA proportion in reaction product (%) | RA (%) | RAG1 (%) | RAG2 (%) | RAG3 (%) | RAG4 (%) | RAG5 (%) | RAG6 (%) | Yield (%) | Total steviol glycoside content (%) in reaction product |
|---|---|---|---|---|---|---|---|---|---|---|---|
| 1) | 89.4 | 79.31 | 10.6 | 16.1 | 17.9 | 15.5 | 15.1 | 13.8 | 11.0 | — | — |
| 2) | 75.4 | 75.88 | 24.6 | 65.7 | 9.7 | — | — | — | — | — | — |
| 4) | 79.4 | 81.92 | 20.6 | 73.2 | 6.2 | — | — | — | — | 65 | 95.3 |

COMPARATIVE EXAMPLE 2

Existing Preparation of Enzymatically Modified Stevia Composition

An enzymatically modified stevia composition was prepared by the method of Example 1 disclosed in Korean Patent No. 10-1535427 (Applicant: Daepyung Co. Ltd.). Specifically, a stevia extract and beta-cyclodextrin were mixed, adjusted to pH 5.5, 70° C., and 30 Brix, and subjected to primary enzyme reaction, as in the present invention, after which the reaction solution was warmed to 90° C. for 1 hr to thus deactivate the enzyme, after which the deactivated solution was spray dried without change.

COMPARATIVE EXAMPLE 3

Preparation of Stevia Composition Using Alpha-Amylase in Lieu of Glucoamylase A stevia composition was prepared in the same manner as in Example 1, with the exception that alpha-amylase was used in lieu of glucoamylase upon secondary enzyme reaction.

The powder thus obtained was measured for RA glycosylation rate, total rebaudioside A proportion in total steviol glycoside, and the proportion of each RA ingredient in the total rebaudioside A. The final RA proportion was less than 60%, and the rate of increase of G1 was judged to be unsuitable for obtaining an enzymatically modified stevia composition.

TEST EXAMPLE 1

Sweetness Quality Sensory Test

Test Example 1-1

Sugar Content Comparison

The sensory test of sweetness and sweetness quality of an aqueous solution obtained by dissolving the sweetener of Example 1 in a concentration of 0.05% was performed through comparison of sweetness quality at different concentrations of the sweetener of Comparative Example 1. The sweetness was tested using a 0.05% aqueous solution of the sweetener of Example 1, prepared by the preparation method of the present invention, and 0.04~0.07% aqueous solutions of the typical enzymatically modified stevia sweetener of Comparative Example 1, adjusted so as to have almost the same sweetness by the pre-test. The sweetness intensity of the 0.05% aqueous solution of the sweetener of Example 1 according to the present invention based on the aqueous solution at different concentrations of Comparative Example 1 was evaluated by a total of 50 persons. Table 9 shows the number of persons for sweetness evaluation for respective concentrations in three levels of strength, consistency and weakness.

TABLE 9

| | 0.05% Aqueous solution of Example 1 | | |
|---|---|---|---|
| Aqueous solution concentration of Comparative Example 1 (%) | Strength (No. of persons) | Consistency (No. of persons) | Weakness (No. of persons) |
| 0.04 | 45 | 3 | 2 |
| 0.05 | 37 | 10 | 3 |
| 0.06 | 25 | 14 | 11 |
| 0.07 | 5 | 15 | 30 |

Test Example 1-2

Quality Analysis

The aqueous solution obtained by dissolving the sweetener of Example 1 in a concentration of 0.05% and the aqueous solution obtained by dissolving the sweetener of Comparative Example 1 in a concentration of 0.06% were evaluated for bitter taste, the quality of sweet taste, and the total taste quality by a panel of 50 persons. The results are shown in Table 9 below.

Based on the above results, it can be confirmed that the stevia composition of the present invention exhibited high proportions of total rebaudioside A and rebaudioside A-G1, and high steviol glycoside content, compared to the stevia composition prepared by the existing method, and was thus suitable for use as a sweetener.

TABLE 10

| | 0.05% Aqueous solution of Example 1 compared to 0.06% aqueous solution of Comparative Example 1 | | |
|---|---|---|---|
| Evaluation item | Strength (No. of persons) | Consistency (No. of persons) | Weakness (No. of persons) |
| Bitter taste | 0 | 5 | 45 |
| Remaining sweet taste (remaining aftertaste) | 3 | 8 | 39 |
| Softness of sweet taste | 40 | 10 | 0 |
| Total taste quality | 41 | 8 | 1 |

Although not shown in Table 10, the aqueous solution of Comparative Example 2 was evaluated as above, and the number of persons who felt the remaining sweet taste was slightly larger, 1.5 times, for the aqueous solution of Comparative Example 2 than for the aqueous solution of Example 1. It is known that an artificial taste or unpleasant and oily taste of a synthetic sweetener increase as the sweet taste remains intense. Thus, the taste quality of the enzymatically modified stevia composition can be judged to be improved through the method of the present invention.

The sweeteners of Examples 1 to 4 satisfy all of Relations (1)~(3) according to the present invention and are very efficiently used as high-quality sweetener because the proportion of rebaudioside A having one glycosyl group attached thereto is significantly high. However, the sweetener of Comparative Example 1 does not satisfy both of Relations (1) and (2), and the composition of step 4, which is the intermediate product upon preparation of the sweetener of Example 1 or 2, regarded as very similar to the sweetener of Comparative Example 2, does not satisfy Relation (1) or (2). Therefore, it is possible to prepare the enzymatically modified stevia composition having an increased proportion of rebaudioside A having one glycosyl group attached thereto according to the present invention compared to the sweetener of Comparative Example 2.

The invention claimed is:

1. A sweetener, comprising steviol glycoside having rebaudioside A including non-glycosylated rebaudioside A and glycosylated rebaudioside A, wherein the sweetener satisfies Relation (1) below:

$$15 \geq (RAG1+RAG2)/RA \geq 3.87 \quad (1)$$

wherein RA represents a proportion of the non-glycosylated rebaudioside A in total wt % of the rebaudioside A, RAG1 represents a proportion of the rebaudioside A having one glycosyl group attached thereto, and RAG2 represents a proportion of the rebaudioside A having two glycosyl groups attached thereto; and a proportion of the total rebaudioside A in the total steviol glycoside is 80 wt % or more, wherein the sweetener satisfies Relation (3) below:

$$32.8 \geq RAG1/RAG2 \geq 7.2 \quad (3).$$

2. The sweetener of claim 1, satisfying Relation (2) below:

$$1.17 \geq (RA+RAG1+RAG2)/TRA \geq 0.8 \quad (2)$$

wherein TRA represents the proportion of the total rebaudioside A in total wt % of the steviol glycoside.

3. The sweetener of claim 1, wherein the sweetener contains 90 wt % or more of the steviol glycoside.

4. A food composition, comprising the sweetener of claim 1.

5. A sweetener, comprising the sweetener of claim 1, in combination with starch, dextrin, and additional sugar.

* * * * *